UNITED STATES PATENT OFFICE.

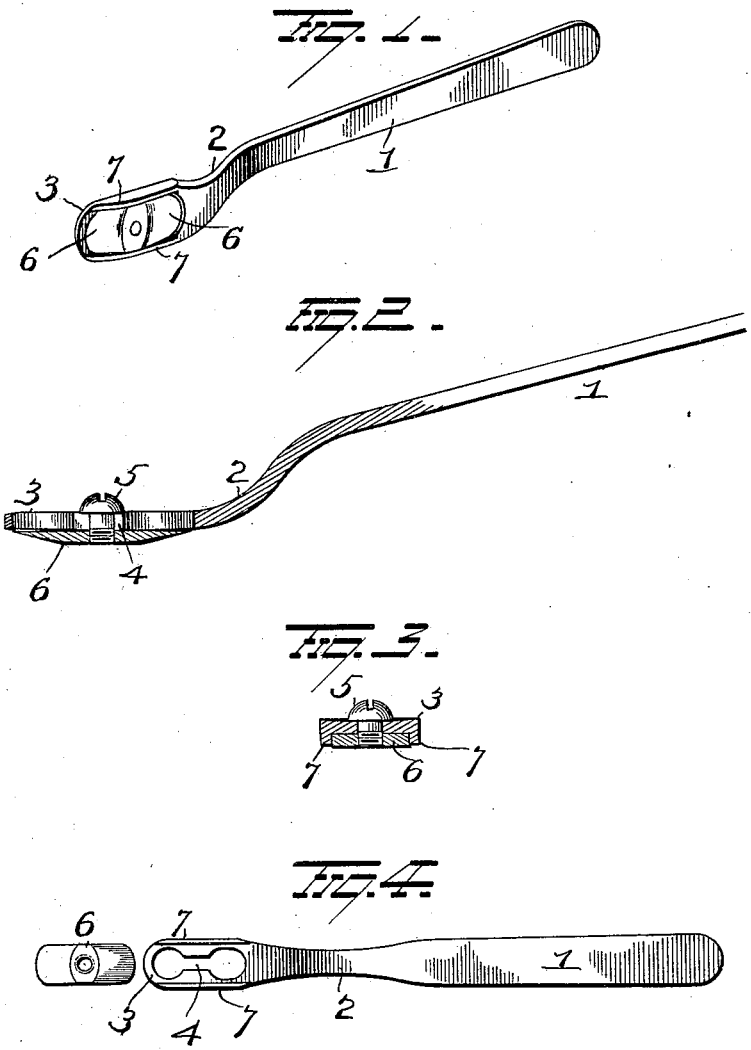

WILLIAM C. HEIMERDINGER, OF LOUISVILLE, KENTUCKY.

SAFETY-KNIFE.

SPECIFICATION forming part of Letters Patent No. 712,792, dated November 4, 1902.

Application filed February 24, 1902. Serial No. 95,305. (No model.)

*To all whom it may concern:*

Be it known that I, WILLIAM C. HEIMERDINGER, of Louisville, in the county of Jefferson and State of Kentucky, have invented certain new and useful Improvements in Safety-Knives; and I do hereby declare the following to be a full, clear, and exact description of the invention, such as will enable others skilled in the art to which it appertains to make and use the same.

My invention relates to an improvement in safety-knives designed particularly for cutting and trimming corns or other callous portions of the epidermis, the object being to provide a knife with a blade having oppositely-disposed cutting edges, so located with relation to the handle that it will operate with both a draw and a push cut, thus permitting it to be used in places where a single cutter could not be conveniently used.

With this end in view my invention consists in the details of construction, as will be more fully described, and pointed out in the claims.

In the accompanying drawings, Figure 1 is a view in perspective of my improved knife. Fig. 2 is a view in longitudinal section of same. Fig. 3 is a view in transverse section through the blade-holding screw, and Fig. 4 is a view of the blade and handle detached.

1 represents a handle of any convenient shape and size, provided with a bent or curved neck 2, carrying the elongated head 3, the latter being approximately flat on its upper face and slightly convexed on its lower face. This head 3 is provided with a central elongated opening 4, the latter being restricted or narrowed near the center of the head, so that the side walls thereof will form a seat for the blade-holding screw 5, thus providing enlarged openings adjacent to each cutting edge of the blade through which the flakes of skin removed by the cutting edges readily escape, thus preventing the possibility of clogging the parts. The blade 6 is beveled on its under side from its center toward both ends and is of a length about equal to the length of the opening in the head. The blade 6 rests on a flat seat formed on the under convex side of the head and is held against lateral displacement by the ribs 7 at opposite sides of said seat, and as the upper face of the blade is flat and the lower face of the head slightly convex the ends of the blade project sufficiently to shave off the fine flakes of the hard skin.

With a blade held at an angle to the surface being operated upon there is a tendency for the blade to scrape or pull instead of making a clean cut. With my improvement the blade rests approximately parallel with the surface operated upon, which insures a free and clean cut. Again, both ends of the blade are guarded or sheathed, and the clearance or opening at the back of each end is sufficiently large for the free escape of all the flakes of skin removed, thus preventing the possibility of the parts choking, and with a blade constructed to cut with either a pull or push movement one is enabled to operate on corns which would be inaccessible to a knife having only one of these movements. It is also apparent that with a blade located approximately parallel with the surface being operated upon it will not cut or flake soft healthy tissue, but where a hardened skin offers resistance it simply shaves the same off in fine flakes.

It is evident that changes in the construction and relative arrangements of the parts might be made without avoiding my invention, and hence I would have it understood that I do not restrict myself to the particular construction and arrangement of parts shown and described; but,

Having fully described my invention, what I claim as new, and desire to secure by Letters Patent, is—

1. A safety-knife comprising a handle having a head the latter being provided with an opening and a blade secured over said opening and having a cutting edge at each end.

2. The combination with a handle having a head, the latter being provided on its lower face with curved or convex ends, and an opening through said head between said ends, of a double-edge blade secured against the lower face of the head, its two cutting ends overlapping the convex ends of the head.

3. The combination with a handle having a head the latter being provided on its lower face with a flat seat, ribs on opposite sides of said seat, curved or convex ends and an opening through the head adjacent to each end, of a double-edged blade resting on said seat and a screw securing the latter in place.

4. The combination with the handle and head, the lower face of the latter having a flat seat, curved or convex ends, openings through same adjacent to the ends, and ribs on opposite sides of the seat, of a double-edge blade the lower face of which is beveled, and a screw for locking the blade in place.

In testimony whereof I have signed this specification in the presence of two subscribing witnesses.

WILLIAM C. HEIMERDINGER.

Witnesses:
A. C. W. PELLE,
ED. STOLL.